US006933477B2

(12) United States Patent
Becker et al.

(10) Patent No.: US 6,933,477 B2
(45) Date of Patent: Aug. 23, 2005

(54) MENU DRIVEN CONTROL SYSTEM FOR A COOKING APPLIANCE

(75) Inventors: Theodore A. Becker, Cleveland, TN (US); Mark A. Boyer, Harrison, TN (US); Susan K. Fisher, Ankeny, IA (US); Brian Jones, Ooltewah, TN (US); Jill L. Means, Des Moines, IA (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 10/410,155

(22) Filed: Apr. 10, 2003

(65) Prior Publication Data

US 2004/0200828 A1 Oct. 14, 2004

(51) Int. Cl.[7] ............................ H05B 1/02; A21B 1/22; F27D 19/00

(52) U.S. Cl. ........................ 219/506; 219/411; 219/720

(58) Field of Search .................................. 219/506, 720

(56) References Cited

U.S. PATENT DOCUMENTS

| | | | | |
|---|---|---|---|---|
| 4,345,145 A | | 8/1982 | Norwood | |
| 4,447,692 A | | 5/1984 | Mierzwinski | |
| 4,459,449 A | | 7/1984 | Hirata | |
| 4,686,356 A | | 8/1987 | Ueda et al. | |
| 4,780,588 A | | 10/1988 | Edamura | |
| 4,841,125 A | | 6/1989 | Edamura | |
| 4,914,277 A | | 4/1990 | Guerin et al. | |
| 4,972,060 A | * | 11/1990 | Edamura | 219/506 |
| 5,044,262 A | | 9/1991 | Burkett et al. | |
| 5,221,817 A | * | 6/1993 | Ota | 219/720 |
| 5,274,209 A | | 12/1993 | Edamura | |
| 5,317,134 A | | 5/1994 | Edamura | |
| 5,345,067 A | | 9/1994 | Ohta et al. | |
| 5,349,164 A | * | 9/1994 | Ohta | 219/506 |
| 5,398,597 A | | 3/1995 | Jones et al. | |
| 5,767,488 A | | 6/1998 | Barger et al. | |
| 5,877,477 A | | 3/1999 | Petty et al. | |
| 5,981,915 A | | 11/1999 | Head | |
| 6,005,229 A | | 12/1999 | Brown et al. | |
| 6,080,972 A | | 6/2000 | May | |
| 6,097,016 A | | 8/2000 | Hirata et al. | |
| 6,111,239 A | | 8/2000 | Park | |
| 6,180,934 B1 | | 1/2001 | Ishizaki et al. | |
| 6,355,914 B1 | | 3/2002 | Stockley | |
| 6,486,453 B1 | | 11/2002 | Bales et al. | |
| 6,710,308 B2 | * | 3/2004 | Sauter et al. | 219/490 |
| 6,750,433 B2 | * | 6/2004 | Guenther et al. | 219/506 |
| 2002/0030051 A1 | | 3/2002 | Thorneywork | |
| 2002/0121514 A1 | | 9/2002 | Ishikawa | |
| 2003/0000947 A1 | | 1/2003 | Kim | |
| 2003/0001902 A1 | | 1/2003 | Choi et al. | |
| 2003/0098888 A1 | | 5/2003 | Guenther et al. | |

FOREIGN PATENT DOCUMENTS

| | | |
|---|---|---|
| JP | 58078017 | 5/1983 |
| JP | 61038337 | 2/1986 |
| JP | 5231650 | 9/1993 |

* cited by examiner

*Primary Examiner*—Joseph Pelham
(74) *Attorney, Agent, or Firm*—Diederiks & Whitelaw, PLC; Allan P. Orsund

(57) ABSTRACT

A cooking appliance includes a control user interface defined by a control panel arranged with a set of dedicated keys for each of various primary cooking modes. The control panel includes a display having various information display zones and various buttons which are provided on each side of and aligned with the information display zones. The buttons are used to select options and settings presented in the display. A controller, based on a hierarchical type organization, is employed to select a choice of cooking modes visually presented to a user in the display. The controller then navigates the user through a series of sub-menus to establish settings and options associated with each particular cooking mode.

29 Claims, 4 Drawing Sheets

MENU DRIVEN CONTROL SYSTEM FOR A COOKING APPLIANCE

BACKGROUND OF THE INVENTION

1. Field of the Invention

The present invention pertains to the art of cooking appliances and, more particularly, to a menu driven control system for a cooking appliance.

2. Discussion of the Prior Art

The art of cooking is currently undergoing substantial change. It is no longer the norm to have a family member home all day with time to cook and prepare meals. Today, more and more consumers must rush home from work to prepare meals for themselves or for their families. In today's fast paced society, time is of the essence. The luxury of spending time in preparing a meal is becoming less and less affordable. As such, consumers demand an oven that will cook a meal in less time than conventional ovens, without sacrificing the quality of the prepared food. In order to meet these demands, manufacturers are combining conventional radiant cooking systems with the rapid cook advantages of convection, microwave, and other types of cooking systems.

Of course, when making a wide range of cooking options available to a consumer in a particular cooking appliance, the complexity of operation will certainly increase. To counteract this inherent situation, electronic control units are being made more sophisticated to aid a user in selecting desired operations. For instance, it has been heretofore proposed to provide a visual display which can convey programming and operational information. With such an arrangement, the control unit can be used to basically walk a user through a programming sequence and also convey a wide range of messages to the user. Of course, it must be kept in mind that a cooking appliance has a relatively small amount of space available for a display and control elements. Certainly, the availability and consumer appeal of providing an abundance of information or control features can depend upon enhancing design features of the overall control system. For instance, the manner in which control information is displayed and selected to a user can have a significant effect on the overall consumer satisfaction and commercial viability of a cooking appliance, particularly a cooking appliance employing both conventional and rapid cook technologies.

Regardless of the control arrangements presented in the prior art, there still exists a need in the art for a more user friendly system for controlling the operation of a cooking appliance. More specifically, there exists a need for an electronic control system which functions to prompt a user, as needed, to input certain cooking information in a convenient and clear manner, and then automatically controls the cooking appliance to perform the desired cooking operation.

SUMMARY OF THE INVENTION

The present invention is directed to a cooking appliance including a control user interface defined by a control panel arranged with a set of dedicated keys for each of various primary cooking modes. The control panel includes a display having various information display zones and various selection keys which are provided on each side of and aligned with the information display zones. The selection keys are used to input desired options and settings presented in the display.

In accordance with the most preferred form of the invention, the controller is based on a hierarchical type organization wherein a user selects an initial cooking mode which is visually presented to the user in the display. The controller then navigates the user through a series of submenus to establish settings and options associated with each particular cooking mode. For example, if the user presses a convection button, various types of convection modes to choose from are presented in the information display zones. The user then presses one of the respective keys aligned with a particular mode presented in the display. For instance, if the user selects a bake mode, several temperatures appear in the display and, once again, an appropriate key is pressed. Once the temperature is selected, the control will initiate a cooking operation and the display will indicate that a preheat cycle has begun, as well as continuing to display the selected temperature for an extended period of time. Similar routines are presented for other available cooking modes. In addition, the display is used in connection with performing, creating, editing, and saving certain favorite cooking operations.

Additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
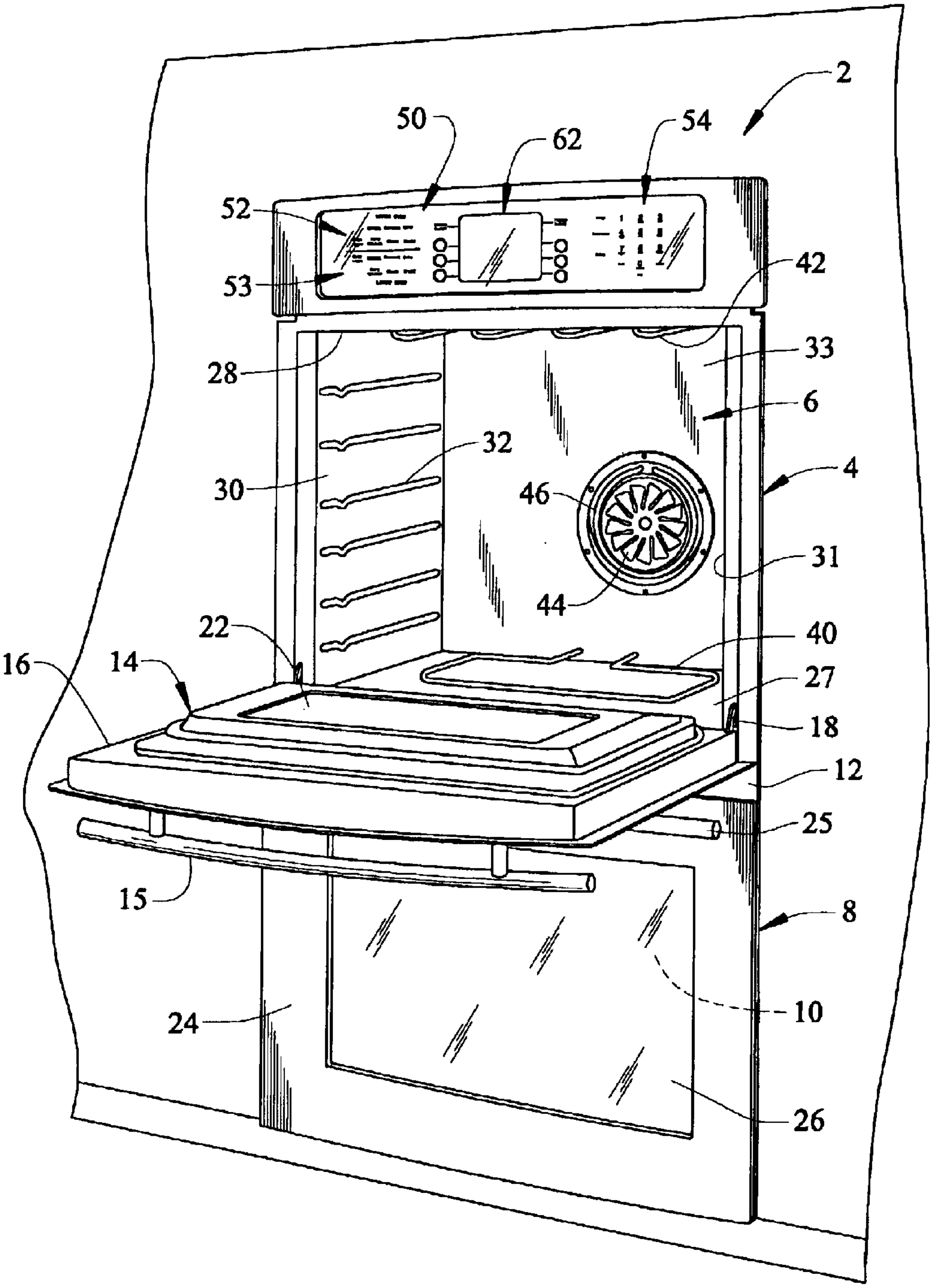
FIG. 1 is a perspective view of a wall oven constructed in accordance with the present invention.

With initial reference to FIG. 1, a cooking appliance constructed in accordance with the present invention is generally indicated at 2. Cooking appliance 2, as depicted, constitutes a double wall oven. However, it should be understood that the present invention is not limited to this model type and can be incorporated into various types of oven configurations, e.g., cabinet mounted ovens, as well as both slide-in and free standing ranges. In any event, in the embodiment shown, cooking appliance 2 constitutes a dual oven wall unit including an upper oven 4 having upper oven cavity 6 and a lower oven 8 having a lower oven cavity 10. Cooking appliance 2 includes an outer frame 12 for supporting both upper and lower oven cavities 6 and 10.

In a manner known in the art, a door assembly 14 is provided to selectively provide access to upper oven cavity 6. As shown, door assembly 14 includes a handle 15 at an upper portion 16 thereof. Door assembly 14 is adapted to pivot at a lower portion 18 to enable selective access to within oven cavity 6. In a manner also known in the art, door 14 is provided with a transparent zone or window 22 for viewing the contents of oven cavity 6 while door 14 is closed. A corresponding door assembly 24 including a handle 25 and a transparent zone or window 26 is provided to selectively access lower oven cavity 10.

As best seen in FIG. 1, oven cavity 6 is defined by a bottom wall 27, an upper wall 28, opposing side walls 30 and 31 provided with a plurality of vertically spaced side rails 32, and a rear wall 33. In the preferred embodiment shown, bottom wall 27 is constituted by a flat, smooth surface designed to improve the cleanability of oven cavity 6. Arranged about bottom wall 27 of oven cavity 6 is a bake element 40. Also, a top broiler element 42 is arranged along upper wall 28 of oven cavity 6. Top broiler element 42 is provided to enable a consumer to perform a grilling process in upper oven 4 and to aid in pyrolytic heating during a self-clean operation. In the preferred form of the invention shown, both bake element 40 and top broiler element 42 are constituted by sheathed electric resistive heating elements.

Based on the above, in the preferred embodiment depicted, cooking appliance 2 actually constitutes an electric, dual wall oven. However, it is to be understood that cooking appliance 2 could equally operate on gas, either natural or propane. In any case, both oven cavities 6 and 10 preferably employ both radiant and convection heating techniques for cooking food items therein. To this end, rear wall 33 is shown to include a convection fan or blower 44. Although the exact position and construction of fan 44 can readily vary in accordance with the invention, in accordance with the most preferred form of the invention, fan 44 draws in air at a central intake zone (not separately labeled) and directs the air into oven cavity 6 in a radial outward direction. Also as clearly shown in this figure, another sheathed electric heating element 46, which preferably takes the general form of a ring, extends circumferentially about fan 44 in order to heat the radially expelled air flow. At this point, it should be noted that a fan cover, which has not been shown for the sake of clarity of the drawings, extends about fan 44 and heating element 46, preferably with the cover having an associated central inlet opening and a plurality of outer radial outlet openings.

Figure 2:
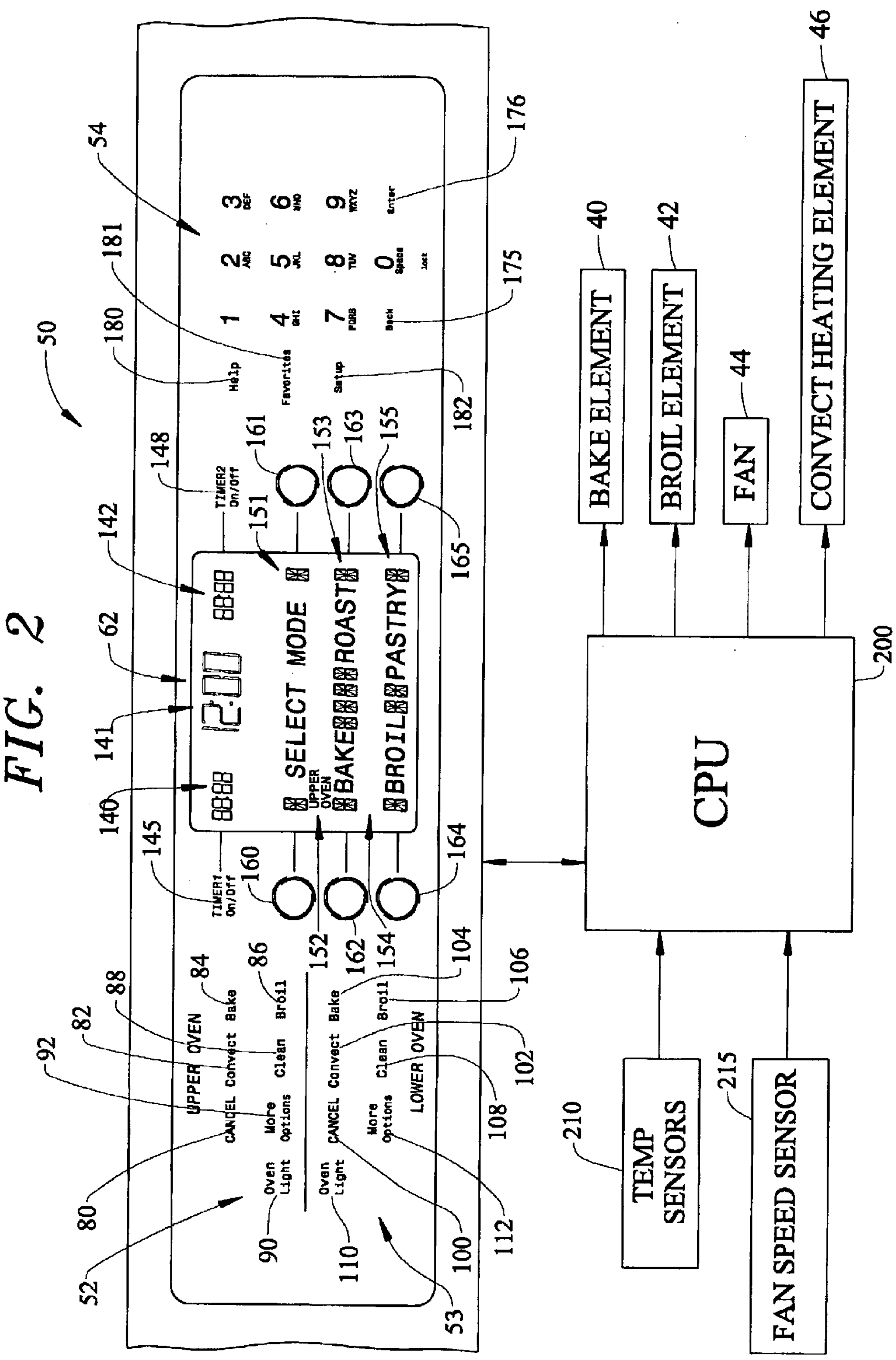
FIG. 2 is an enlarged view of a control panel employed in connection with the wall oven of FIG. 1 illustrating an initial stage in a potential program sequence.
Figure 3:
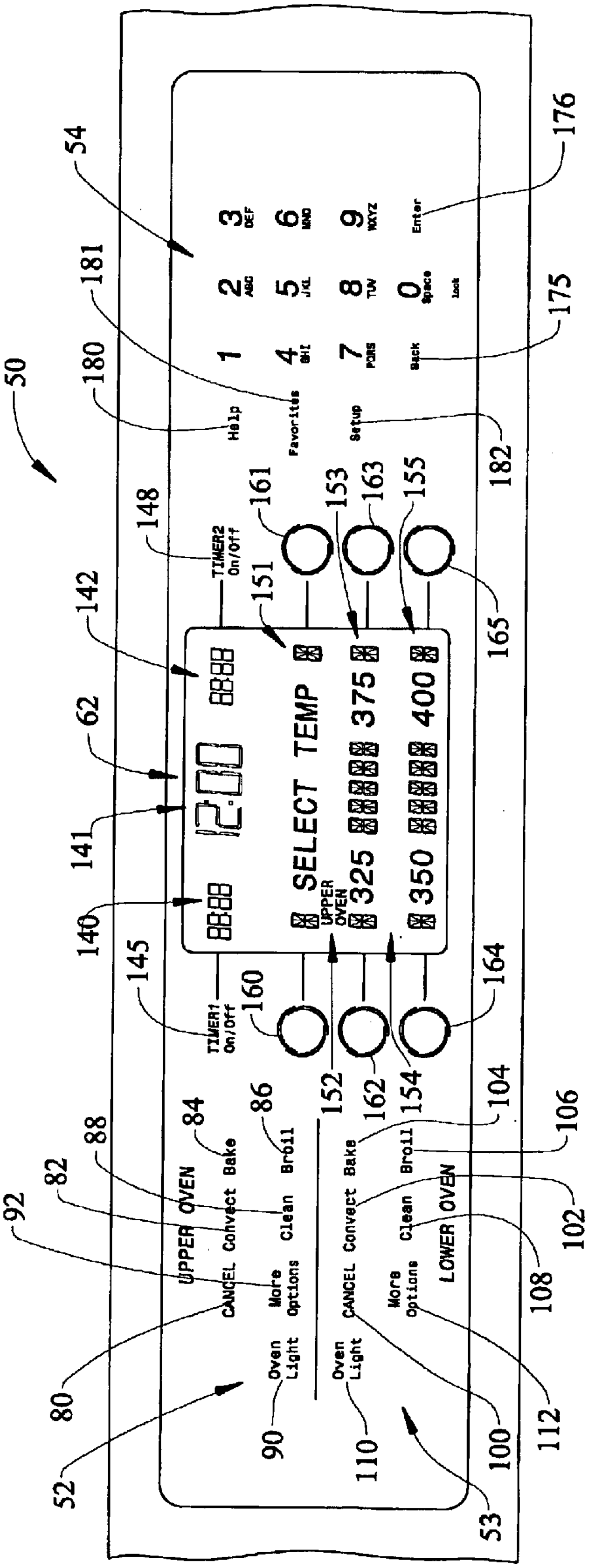
FIG. 3 is another view of the control panel illustrating a subsequent stage in the potential program sequence.

As further shown in FIGS. 1 and 2, cooking appliance 2 includes an upper control panel 50 having a plurality of control elements. In accordance with one embodiment, the control elements are constituted by first and second sets of oven control buttons 52 and 53, as well as a numeric pad 54. Control panel 50 is adapted to be used to input desired cooking parameters for cooking appliance 2. More specifically, the first and second sets of control buttons 52 and 53, in combination with numeric pad 54 and a display 62, enable a user to establish particular cooking operations for upper and lower ovens 4 and 8 respectively.

In the preferred embodiment particularly shown in FIG. 2, first set of control buttons 52 includes a cancel button 80, a convection button 82, a bake button 84, a broil button 86, and a clean button 88. In addition, first set of control buttons 52 also preferably includes an oven light button 90 and a button 92 used to access more cooking options which are conveyed to the user through display 62. In a corresponding manner, second set of control buttons 52 includes a cancel button 100, a convection button 102, a bake button 104, a broil button 106, and a clean button 108. Furthermore, second set of control buttons 53 also preferably includes an oven light button 110 and a button 112 which is used to access more cooking options that are conveyed to the user through display 62.

To this end, display 62 is preferably divided into various sections. In accordance with the most preferred embodiment of the invention, an uppermost section of display 62 is sub-divided into three time display zones 140–142. More specifically, leftmost display zone 140 constitutes a first timer zone having an associated timer button 145. Central display zone 141 constitutes a clock for cooking appliance 2. Rightmost display zone 142 constitutes a second timer zone having an associated timer button 148.

Spaced below time display zones 140–142 are a series of vertically spaced information display zones 151–155. Each of information display zones 151, 153 and 155 has associated left and right portions or regions (not separately labeled). As will be detailed more fully hereinafter, each of the left and right regions have associated therewith and linked thereto laterally positioned selection keys or buttons 160–165.

As shown, numeric pad 54 preferably enables alphanumeric input. That is, in addition to presenting numbers 0–9, numeric pad 54 doubles as an input source for alpha information. To this end, the number 2 button functions for ABC letter entry; the number 3 button functions for DEF letter entry; the number 4 button functions for GHI letter entry; the number 5 button functions for JKL letter entry; the number 6 button functions for MNO letter entry; the number 7 button functions for PQRS letter entry; the number 8 button functions for TUV letter entry; and the number 9 button functions for WXYZ letter entry. The number 0 button can also be used to input a space. On either side of the number 0 button are Back and Enter buttons 175 and 176 which can be used in combination with the various alpha keys for information entry. Finally, provided adjacent numeric pad 54 are Help, Favorites and Setup buttons 180–182.

In general, control panel 50 is linked to a controller or CPU 200 formed as part of cooking appliance 2. Therefore, CPU 200 receives user inputs and selections through control panel 50, as well as signals from sensors associated with cooking appliance 2, i.e. oven temperature sensors for upper and lower ovens 4 and 8 as generally indicated at 210 and a fan speed sensor 215. In turn, CPU 200 controls bake element 40, top broiler element 42, convection fan 44 and convection heating element 46.

The present invention is particularly directed to the manner in which cooking operation selections are made in a hierarchical fashion by presenting options and information in display zones 151–155, while making selections through one or more of selection buttons 160–165. The manner in which cooking appliance 2 operates in accordance with the most preferred embodiment of the invention will be described in detail below, particularly with reference to FIGS. 2–5 which illustrate both a main menu and sub-menus employed in connection with the programming sequence of cooking appliance 2 for an exemplary convection bake operation.

Upon initially selecting a convection operation through button 82, display 62 takes the form illustrated in FIG. 2. That is, CPU 200 has been made aware that a convection operation is to be perform and presents in display 62 various options concerning the desired mode of cooking operation. More specifically, information display zone 151 provides instructional information to the user that a mode selection must be made. In addition, information display zone 153 is sub-divided into two laterally spaced, distinct information display regions (not separately labeled) presenting available bake and roast modes adjacent selection buttons 162 and 163 respectively. In a similar manner, information display zone 155 is sub-divided into two laterally spaced information display regions (also not separately labeled) presenting available broil and pastry modes adjacent selection 164 and 165 respectively. In addition, in the scenario presented, information display zone 152 indicates that programming information is being presented for upper oven 4, rather than lower oven 8, based on the pressing of button 82. Therefore, information display zone 152 presents fixed information for upper oven 4 based on user inputs and does not present available selections or options to a user in connection with selection buttons 160–165. Preferably, information display zone 154 presents corresponding information for lower oven 8.

At this point, the user chooses one of the available modes of operation by pressing one of selection buttons 162–165. For the sake of example, it is assumed that button 162 is selected such that a bake mode is desired. Thereafter, display 62 changes to the arrangement shown in FIG. 3 wherein the user is prompted to enter a desired cooking temperature. As shown, information display zone 151 conveys to the user that a temperature needs to be selected. At the same time, information display zones 153 and 155 are again sub-divided to present temperature options. More specifically, information display zone 153 makes available temperatures 325° F. and 375° F., while information display zone 155 presents temperatures 350° F. and 400° F. In addition, information display zone 152 continues to reference upper oven 4.

With this arrangement, the user can select a desired cooking temperature through one of selection buttons 162–165. If the desired temperature is not presented in display 62, or if simply preferred, the user can directly input an operating temperature through numeric keypad 54. At this point, assuming a baking temperature of 325° F. is selected, display 62 will assume the arrangement presented in FIG. 4 wherein a bake preheat mode is entered, as conveyed to the user in information display zone 151. In accordance with the invention, information display zone 155 presents, adjacent selection button 165, the fact that other options are available, such as programming cooking appliance 2 for a keep warm operation after the bake operation is completed.

Figure 4:
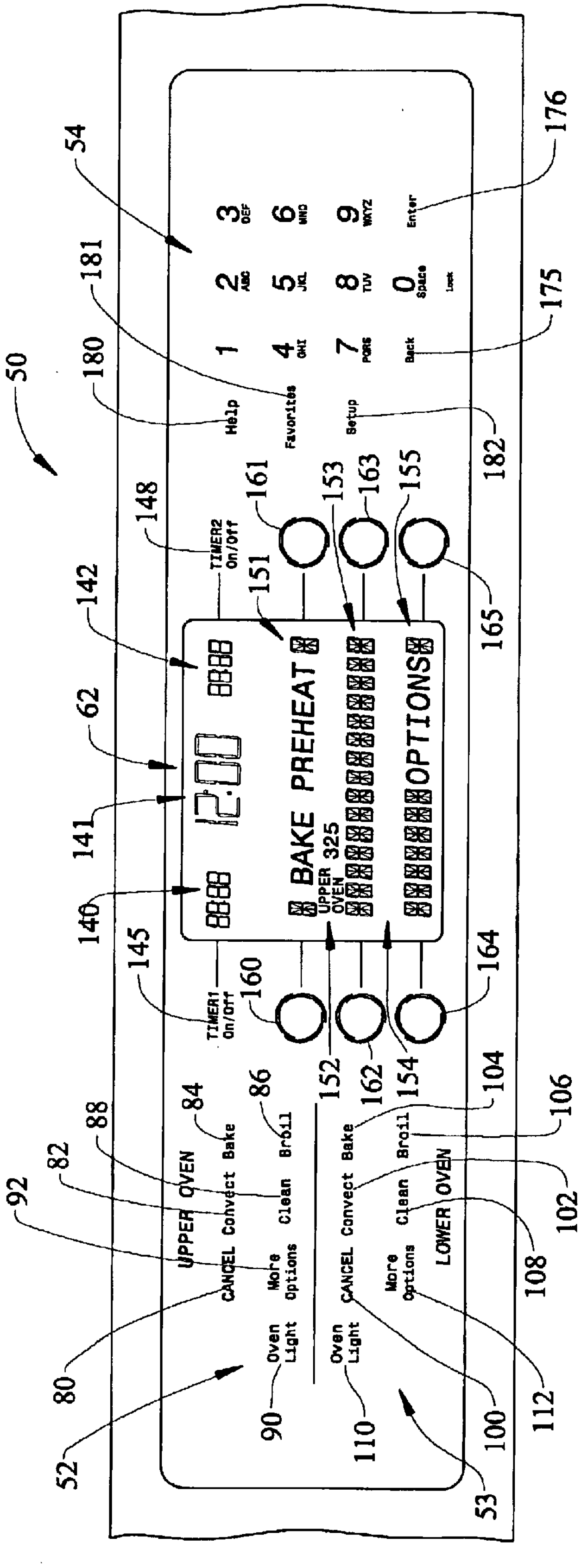
FIG. 4 is a further view of the control panel illustrating a still further stage in the potential program sequence.

In further accordance with the most preferred embodiment of the invention, it is desired to convey to the user the selected temperature for an extended period of time. That is, even after selection button 162 is pressed and the bake mode is entered, it is desirable to continue to display the selected temperature for some predetermined period of time, preferably in information display zone 152 as shown in FIG. 4, and then to switch to a display of the actual temperature for oven cavity 6. Most preferably, the selected temperature is displayed during a programming phase, i.e. until the actual preheat mode is entered, and then thereafter for in the order of 5–15 additional seconds, most preferably 10 seconds, in order to at least provide the user ample time to verify the selected temperature and to make any desired changes, such as through the use of back button 175. Thereafter, the temperature display preferably switches to an actual temperature in oven cavity 6 based on signals from temperature sensor 210, whereupon the user can follow the progress of the preheat operation. Although not depicted, the programming sequence can also include a cooking time input screen.

Again, it should be realized that display 62 can be used to convey a wide range of information and programming options to a user. In addition to the various cooking modes available through the first and second sets of oven control buttons 52 and 53, display 62 can be effectively used in connection with favorites button 181. In general, controller 200 preferably enables the storing and retrieving of customized cooking profiles through a favorites mode of operation. In accordance with the invention, the favorites mode is able to store a cooking profile, name that profile and execute that profile at a later time. In general, the favorites mode employed in connection with cooking appliance 2 can be broken down into five sub-modes as discussed below.

The first sub-mode concerns creating a new favorite profile. Although not shown in the drawings, display 62 is used in this mode to prompt a user to enter the name of the favorite cooking operation to be stored. This name will be entered via numeric pad 54 wherein each time one of the number 2–9 buttons is pressed, the display will cycle between the relevant number and then each of the corresponding alphabetical letters associated therewith as outlined above. The particular manner of programming cooking appliance 2 in accordance with numeric pad 54 is actually covered by co-assigned U.S. Patent Application entitled "Alpha-Numeric Data Entry For an Electronic Oven Control System" which is filed on even date herewith and incorporated by reference. After entering the name of the favorite cooking profile, controller 200 has display 62 prompt the user to select the cooking mode for that favorite profile. Through selection buttons 160–165, this mode is selected. In the same fashion as that discussed above, the user will then be prompted to enter a cook time and temperature as needed. After all this information is entered, controller 200 will then store this profile in a favorites list.

The second sub-mode constitutes editing a favorite profile. In this case, controller 200 prompts a user to select, from a list of stored favorite profiles, a particular profile to be edited. Once the particular profile is selected, controller 200 prompts the user through display 62 for the option to edit the profile's name. If selected, the user will then edit the name via numeric keypad 54. Controller 200 will then prompt the user to edit the cooking mode, time and temperature in sequence. After this information is entered, controller 200 will then store this updated profile in the favorites list.

A third sub-mode concerns deleting a stored profile which has controller 200 prompting the user through display 62 to select from a list of stored profiles a particular favorite profile to be deleted. Once the favorite is selected through selection buttons 160–165, controller 200 will prompt the user for the option to delete this favorite profile from the list. If selected, the favorites name and profile are deleted.

The fourth sub-mode concerns providing a profile list. In this mode, controller 200 prompts the user to select, from a list of stored profiles, a particular favorite profile to be used and executed. Once a favorite profile is selected, controller 200 operates cooking appliance 2 in accordance with the stored cooking operation parameters of that profile.

Finally, cooking appliance 2 is preferably provided with the ability to save a particular cooking operation that was successfully completed as a favorite profile. In this mode, controller 200 prompts a user to store the last cooking operation through the use of an options sub-menu. If desired, the user will be able to enter the name of that particular cooking profile via numeric pad 54 on control panel 50. After this information is entered, controller 200 will then store this information in the favorites list.

Based on the above, it should be readily apparent that the overall menu driven display system of the present invention provides a compact, versatile and efficient arrangement for conveying information to a user, inputting programming selections, and displaying both selected parameters and operational conditions to the user. The ability of at least information display zones 151, 153 and 155 to be subdivided for increasing the number of available options, yet also being usable as respective, single display zones to convey long instructions or options, represents a particular advantage in connection with the overall programmability and user friendly aspects of the invention. In addition, the manner in which selection buttons 160–165 are presented juxtapose and aligned with information display zones 151, 153 and 155 enables the size of display 62 to actually be enlarged, yet easily provides the user with clear, fixed references to ease the making of desired programming selections.

Although described with reference to a preferred embodiment of the invention, it should be readily understood that various changes and/or modifications can be made to the invention without departing from the spirit thereof. For instance, although the rapid cook source employed in connection with cooking appliance 2 is a convection system, other types of rapid cook arrangements, such as microwave energy, could be employed in place of, or in addition to, the convection system. In general, the invention is only intended to be limited by the scope of the following claims.

We claim:

1. A cooking appliance comprising:

an oven cavity;

at least one radiant heating element arranged for producing radiant heat in the oven cavity;

a rapid cook heating source for the oven cavity;

a control panel including:

a display having a plurality of information display zones for conveying information and programming options to a user, said information display zones being capable of being selectively sub-divided into laterally spaced, distinct display regions; and various selection members for inputting desired cooking operation parameters corresponding to the information and programming options conveyed to the user in the information display zones, said selection members being arranged juxtapose the laterally spaced display regions; and a controller for presenting a sequence of programming screens on the display and establishing a cooking operation within the oven cavity based on the desired cooking operation parameters.

2. The cooking appliance according to claim 1, wherein the selection members are arranged in a series of vertically spaced pairs, each of the vertically spaced pairs constituting two selection members arranged on opposing sides of and aligned with a respective one of the plurality of information display zones.

3. The cooking appliance according to claim 2, wherein the selection members are arranged outside the display.

4. The cooking appliance according to claim 2, wherein the plurality of information display zones are capable of displaying alpha-numeric data.

5. The cooking appliance according to claim 1, wherein the rapid cook heating source constitutes a convection fan for developing an airflow introduced into the oven cavity and an electric heating element for heating the airflow prior to introduction into the oven cavity.

6. The cooking appliance according to claim 1, wherein the cooking appliance constitutes a double wall oven having upper and lower ovens, said control panel further including first and second sets of oven control buttons for inputting desired cooking modes for the upper and lower ovens, as well as a numeric pad for inputting at least one of the desired cooking operation parameters.

7. The cooking appliance according to claim 6, wherein the at least one of the desired cooking operation parameters can be selectively entered by a user through either the numeric pad or the selection members.

8. The cooking appliance according to claim 1, wherein the control panel further includes a selector button for entering a favorites mode of operation in which said controller operates the cooking appliance based on a preprogrammed cooking profile.

9. The cooking appliance according to claim 8, further comprising: means for creating, editing and saving cooking profiles for later use by the controller in the favorites mode of operation, wherein said means for creating, editing and saving cooking profiles includes the information display zones and the selection members.

10. The cooking appliance according to claim 1, wherein one of the desired cooking operation parameters constitutes a cooking temperature, said controller functioning to display the cooking temperature within the display for a predetermined time period after the cooking operation has been initiated following a programming period.

11. The cooking appliance according to claim 10, wherein the predetermined time period is approximately ten seconds.

12. A cooking appliance comprising:

an oven cavity;

at least one radiant heating element arranged for producing radiant heat in the oven cavity;

a rapid cook heating source for the oven cavity;

a control panel including:

a display having a plurality of information display zones for conveying information and programming options to a user; and various selection members for inputting desired cooking operation parameters corresponding to the information and programming options conveyed to the user in the information display zones, said selection members being arranged outside the display and directly juxtapose a respective one of each of the information display zones; and a controller for presenting a sequence of programming screens and establishing a cooking operation within the oven cavity based on the desired cooking operation parameters, wherein the selection members are arranged in a series of vertically spaced pairs, each of the vertically spaced pairs constituting two selection members arranged on opposing sides of and aligned with a respective one of the plurality of information display zones.

13. The cooking appliance according to claim 12, wherein said information display zones are capable of being selectively sub-divided into laterally spaced, distinct display regions.

14. The cooking appliance according to claim 12, wherein the plurality of information display zones are capable of displaying alpha-numeric data.

15. The cooking appliance according to claim 12, wherein the rapid cook heating source constitutes a convection fan for developing an airflow introduced into the oven cavity and an electric heating element for heating the airflow prior to introduction into the oven cavity.

16. The cooking appliance according to claim 12, wherein the cooking appliance constitutes a double wall oven having upper and lower ovens, said control panel further including first and second sets of oven control buttons for inputting desired cooking modes for the upper and lower ovens, as well as a numeric pad for inputting at least one of the desired cooking operation parameters.

17. The cooking appliance according to claim 16, wherein the at least one of the desired cooking operation parameters can be selectively entered by a user through either the numeric pad or the selection members.

18. The cooking appliance according to claim 12, wherein the control panel further includes a selector button for entering a favorites mode of operation in which said controller operates the cooking appliance based on a preprogrammed cooking profile.

19. The cooking appliance according to claim 18, further comprising: means for creating, editing and saving cooking profiles for later use by the controller in the favorites mode of operation, wherein said means for creating, editing and saving cooking profiles includes the information display zones and the selection members.

20. The cooking appliance according to claim 12, wherein one of the desired cooking operation parameters constitutes a cooking temperature, said controller functioning to display the cooking temperature within the display for a predetermined time period after the cooking operation has been initiated following a programming period.

21. The cooking appliance according to claim 20, wherein the predetermined time period is approximately ten seconds.

22. A method of programming a cooking appliance including an oven cavity comprising:

receiving an initial cooking mode selection inputted by a user;

presenting a user with a sequence of programming screens in a display having a plurality of vertically spaced information display zones;

pausing between successive ones of the sequence of programming screens to receive desired input selections from the user through various selection members arranged in a series of vertically spaced pairs, with each of the vertically spaced pairs constituting two selection members arranged on opposing sides of and aligned with a respective one of the plurality of information display zones; and operating a heating system for the oven cavity based on the initial cooking mode and the desired input selections.

23. The method of claim 22, further comprising:

presenting the sequence of programming screens by subdividing each of the information display zones into laterally spaced, distinct display regions, with each of the selection members corresponding to one of the laterally spaced, distinct display regions.

24. The method of claim 23, wherein the sequence of programming screens displays alpha-numeric data to a user.

25. The method of claim 22, wherein at least one of the desired cooking operation parameters can be selectively entered through either a numeric pad or one of the selection members.

26. The method of claim 22, further comprising:

enabling a favorites mode of operation to be entered wherein the cooking appliance operates based on a predetermined set of cooking operation parameters.

27. The method of claim 26, further comprising:

creating, editing and saving cooking profiles, through the information display zones and the selection members, for later use by the controller in the favorites mode of operation.

28. The method of claim 22, wherein one of the desired cooking operation parameters constitutes a cooking temperature, said method further comprising: displaying the cooking temperature within the display for a predetermined time period after the cooking operation has been initiated following a programming period.

29. The method of claim 28, wherein the predetermined time period is approximately ten seconds.

* * * * *